United States Patent
Padigala et al.

(10) Patent No.: US 9,371,412 B2
(45) Date of Patent: Jun. 21, 2016

(54) PROCESS FOR IMPARTING GREASE, OIL AND WATER REPELLENCE TO SUBSTRATES

(75) Inventors: Mahesh Padigala, Bear, DE (US); Grazia Meroni, Lipomo (IT); George Michael Finelli, Arese (IT)

(73) Assignee: Solvay Specialty Polymers Italy S.P.A., Milan (IT)

( * ) Notice: Subject to any disclaimer, the term of this patent is extended or adjusted under 35 U.S.C. 154(b) by 524 days.

(21) Appl. No.: 12/999,557

(22) PCT Filed: Jun. 30, 2009

(86) PCT No.: PCT/EP2009/058146
§ 371 (c)(1),
(2), (4) Date: Dec. 16, 2010

(87) PCT Pub. No.: WO2010/000715
PCT Pub. Date: Jan. 7, 2010

(65) Prior Publication Data
US 2011/0189395 A1  Aug. 4, 2011

Related U.S. Application Data

(60) Provisional application No. 61/077,307, filed on Jul. 1, 2008.

(51) Int. Cl.
*B05D 5/00* (2006.01)
*C08G 18/50* (2006.01)
*C08G 65/00* (2006.01)
*D21H 19/24* (2006.01)
*D21H 21/16* (2006.01)

(52) U.S. Cl.
CPC .......... *C08G 18/5015* (2013.01); *C08G 65/007* (2013.01); *D21H 19/24* (2013.01); *D21H 21/16* (2013.01)

(58) Field of Classification Search
CPC .. C08G 65/007; C05G 18/5015; D21H 19/24; D21H 21/16
USPC ........................................ 427/256
See application file for complete search history.

(56) References Cited

U.S. PATENT DOCUMENTS

| | | |
|---|---|---|
| 3,948,668 A | 4/1976 | Hayek et al. |
| 4,163,001 A | 7/1979 | Carumpalos et al. |
| 5,691,000 A | 11/1997 | Montagna et al. |
| 5,769,935 A | 6/1998 | Swan |
| 5,876,815 A | 3/1999 | Sandstrom et al. |
| 5,919,293 A | 7/1999 | Moffatt et al. |
| 6,221,434 B1 | 4/2001 | Visca et al. |
| 6,270,214 B1 | 8/2001 | Smith et al. |
| 6,514,567 B2 | 2/2003 | Carignano et al. |
| 7,534,323 B2 * | 5/2009 | Iengo et al. ........... 162/164.1 |
| 2005/0000668 A1 * | 1/2005 | Iengo et al. ........... 162/164.1 |
| 2006/0189788 A1 * | 8/2006 | Araki et al. ........... 528/425 |
| 2007/0020462 A1 | 1/2007 | Rudolph et al. |

FOREIGN PATENT DOCUMENTS

| | | |
|---|---|---|
| DE | 1794356 A1 | 2/1973 |
| EP | 533159 A1 | 3/1993 |
| EP | 1138826 A2 | 10/2001 |
| EP | 1225178 A1 | 7/2002 |
| EP | 1273704 A1 | 1/2003 |
| EP | 1327649 A2 | 7/2003 |
| EP | 1369442 A1 | 12/2003 |
| EP | 1371676 A1 | 12/2003 |
| EP | 1484445 A1 | 12/2004 |
| EP | 1489124 A1 | 12/2004 |
| EP | 1690882 A1 | 8/2006 |
| GB | 1564722 A | 4/1980 |
| JP | 2006298948 A | 11/2006 |
| WO | WO 0194480 A2 | 12/2001 |
| WO | WO 03099466 A1 | 2/2005 |

* cited by examiner

*Primary Examiner* — Xiao Zhao
(74) *Attorney, Agent, or Firm* — Osha • Liang LLP

(57) ABSTRACT

A process for imparting grease, oil and water repellence to a substrate comprises applying by means of a printing process on at least a portion of the surface of such substrate a composition comprising at least one (per)fluoropolyether derivative. By means of such process it is possible to confer suitable grease, oil and water repellence properties to substrates via selective treatment/coating, by significantly reducing total amount of fluoro-containing additive required for the target properties.

3 Claims, No Drawings

PROCESS FOR IMPARTING GREASE, OIL AND WATER REPELLENCE TO SUBSTRATES

CROSS-REFERENCE TO RELATED APPLICATION

The present application is a U.S. national stage application under 35 U.S.C. §371 of International Application No. PCT/EP2009/058146, filed Jun. 30, 2009, which claims the benefits of U.S. Provisional Application Ser. No. 61/077,307 filed Jul. 1, 2008, the whole content of this application being herein incorporated by reference for all purposes.

TECHNICAL FIELD

This invention pertains to an improved method for conferring grease, oil and water repellence to substrates, involving the use of certain fluorinated additives.

BACKGROUND ART

Additivation of substrates, in particular packaging substrates (e.g. cellulosic substrates) with fluorochemicals to impart grease, oil, wax and solvent repellence has been known for some time.

These compounds are used for the manufacture of substrates suitable to be used with fat foods for short periods (clamshells or bags for hamburger, fast food products, popcorn, small cardboard tubs for chips, etc.) and for longer periods (flexible packages for fat foods, food for dogs and cats, biscuits, etc.).

Among commercially available fluorochemical modifiers well-suited for this application, those based on (per)fluoropolyethers have drawn increased attention, due to their better HSE and toxicological profile with respect to perfluoroalkyl-containing counterparts and their acceptable oil and water repellence properties.

Among techniques for conferring oleo-repellence to substrates, in particular cellulosic substrates, treatments with (per)fluoropolyether derivatives comprising perfluorooxyalkylenic chains in a polyurethane backbone (see e.g. EP 1273704 A (AUSIMONT SPA (IT)) Jan. 8, 2003 and EP 1369442 A (Dec. 10, 2003) Dec. 10, 2003) or with (per) fluoropolyether derivatives comprising phosphate groups (as taught e.g. in U.S. Pat. No. 5,691,000 (AUSIMONT SPA (IT)) Nov. 25, 1997, EP 1138826 A (AUSIMONT SPA (IT)) Oct. 4, 2001, EP 1273704 A (AUSIMONT SPA (IT)) Jan. 8, 2003, and EP 1371676 A (SOLVAY SOLEXIS S.P.A.) Dec. 17, 2003) or with (per)fluoropolyether derivatives having carboxyl groups (as shown in EP 1484445 A (SOLVAY SOLEXIS SPA (IT)) Dec. 8, 2004 and EP 1489124 A (SOLVAY SOLEXIS SPA (IT)) Dec. 22, 2004) are known.

Said (per)fluoropolyether derivatives are typically incorporated into the cellulose substrate during the manufacture itself of the substrate at the paper mill. Actually, said derivatives are generally introduced in formulations either employed in size-press treatment, coating treatment, calender water box treatment or in wet-end treatment in the paper machines.

A paper machine is actually a large de-watering device consisting generally of a head box, a wire section, press section and dryer section wherein starting from a dilute suspension of fibres, and possibly fillers, dyes and other chemicals, which is homogenously fed onto a fine mesh through which the water drains, the fibres web is conveyed onto subsequent pressing and drying stages.

In the wet-end treatment, the (per)fluoropolyether derivatives are introduced in the initial fibres suspension dispersion and caused to deposit onto the fibres during web formation.

When used in the size-press treatment, the (per)fluoropolyether derivative is caused to impregnate the fibres web of paper by passing this latter into a sizing liquid pond located above a roll nip. As a result, the paper web absorbs the sizing liquor including the (per)fluoropolyether derivatives.

When used in a coating treatment, the (per)fluoropolyether derivative is caused to impregnate the fibres web of paper by passing this latter through a coater, typically rod or metering blade. As a result, a thin film of coating of the (per)fluoropolyether derivative is applied to the surface of the paper web.

When used in a calendar water box, the (per)fluoropolyether derivative is caused to impregnate the fibres web of paper by passing this latter through a calender stack equipped with a water box. The water box applies a dilute solution of (per)fluoropolyether derivative to the calender roll which is then transferred to the paper web.

Nevertheless, in all these processes, a significant amount of (per)fluoropolyether derivatives is caused to penetrate the entire thickness and surface of the substrate, while water and oil repellence are required only at the surface of certain areas of the manufactured substrates, in particular of paper. Also, (per)fluoropolyether derivatives are lost with broke and trimmed papers. Actually, for cellulosic substrates, (per)fluoropolyether derivatives costs contribution represents a high fraction of the final cost of the paper: even if present in amounts ranging from 0.1 to 1% by weight with respect to the dry fibres, (per)fluoropolyether derivatives represent from 10% up to 50% of the total costs (including the process water, the energy and the cellulose). It is thus essential to reduce consumption of these additives, their recycle and improper sizing.

Moreover, said (per)fluoropolyether derivatives might interfere with glueability and printability of the treated substrates. As the treatments performed at the paper mill are not selective and the whole thickness and surfaces are completely modified, glueability and printability of paper obtained thereof are poor, so that final parts are generally provided with additional coatings/surface treatment for overriding these drawbacks.

Need is thus felt to provide a novel method for imparting grease, oil and water repellence to substrates, in particular packaging substrates which would be more economical and provide a more tailored application of the additive on the substrate, while maintaining glueability and printability where required for manufacturing final packaging, bags and the like.

DISCLOSURE OF INVENTION

It is thus an object of the present invention a process for imparting grease, oil and water repellence to a substrate, said process comprising applying by means of a printing process on at least a portion of the surface of said substrate a composition comprising at least one (per)fluoropolyether derivative.

The Applicant has found that by means of the process of the invention it is possible to confer suitable grease, oil and water repellence properties to substrates via selective treatment/coating, by significantly reducing total amount of fluorocontaining additive required for the target properties.

Substrates used in the process of the invention are typically those used in packaging applications, comprising, notably cellulose substrates, which are indeed those preferred.

Cellulose substrates include notably all types and kinds of cellulose-containing materials, including notably paper (e.g.

kraft paper), paper boards (e.g. solid bleached sulphite paper board) and other cellulosic fibers assemblies.

The term '(per)fluoropolyether derivative' is hereby used to denote a polymer comprising recurring units (R1), said recurring units comprising at least one ether linkage in the main chain and at least one fluorine atom (fluoropolyoxyalkene chain).

The number average molecular weight of the fluoropolyoxyalkene chain of the (per)fluoropolyether derivative is generally of at least 400, preferably of at least 600.

The number average molecular weight of the fluoropolyoxyalkene chain of the (per)fluoropolyether derivative is generally of at most 100 000, preferably of at most 20 000.

Good results have been obtained with (per)fluoropolyether derivatives having a fluoropolyoxyalkene chain having an average molecular weight comprised between 400 and 100 000.

Excellent results have been obtained with (per)fluoropolyether derivatives having a fluoropolyoxyalkene chain having an average molecular weight comprised between 500 and 10 000.

Preferably the recurring units R1 of the (per)fluoropolyether derivative are selected from the group consisting of:
(I) —CFX—O—, wherein X is —F or —CF$_3$; and
(II) —CF$_2$—CFX—O—, wherein X is —F or —CF$_3$; and
(III) —CF$_2$—CF$_2$—CF$_2$—O—; and
(IV) —CF$_2$—CF$_2$—CF$_2$—CF$_2$—O—; and
(V) —(CF$_2$)$_j$—CFZ—O— wherein j is an integer from 0 to 3 and Z is a fluoropolyoxyalkene chain comprising from 1 to 20 recurring units chosen among the classes (I) to (IV) here above;
and mixtures thereof.

Should the (per)fluoropolyether derivative comprise recurring units R1 of different types, advantageously said recurring units are randomly distributed along the fluoropolyoxyalkene chain.

The (per)fluoropolyether derivative can be 'neutral' or 'functional'.

A neutral (per)fluoropolyether derivative is a polymer comprising a fluoropolyoxyalkene chain and free from functional groups; end-groups of said neutral (per)fluoropolyether derivative are typically fluorocarbon group, optionally comprising hydrogen or halogen (e.g. chlorine) atoms.

The (per)fluoropolyether derivative is preferably a functional (per)fluoropolyether, that is to say a polymer comprising a fluoropolyoxyalkene chain, as above defined, and at least one functional group comprising a heteroatom other than fluorine, preferably a heteroatom selected among O, S, N, P, Si and mixtures thereof.

As used herein, the term "functional group" has its general meaning as intended in organic chemistry and it encompasses atoms or combination of atoms bonded to the carbon skeleton of the fluoropolyoxyalkene chain, which confers to the (per)fluoropolyether derivative specific reactivity and chemical properties.

Preferably the functional (per)fluoropolyether is a compound complying with formula (I) here below:

$$T_1\text{-}(CFX)_p\text{—O—}R_f\text{—}(CFX)_{p'}\text{-}T_2 \quad (I)$$

wherein:
each of X is independently F or CF$_3$;
p and p', equal or different each other, are integers from 0 to 3;
R$_f$ is a fluoropolyoxyalkene chain as above defined;
at least one of T$_1$ and T$_2$, which are the same or different each other, is a functional group comprising a heteroatom chosen among O, S, N, P, Si and mixtures thereof, optionally bound to another fluoropolyoxyalkene chain;
the remaining T$_1$ or T$_2$, if any, being chosen among H, halogen atoms, C$_1$-C$_{30}$ end-group.

According to a first embodiment of the invention, the (per)fluoropolyether derivative comprises at least one functional group selected from the group consisting of carboxylic acid and derivatives thereof (e.g. alkaline metal salts, alkaline-earth metal salts, ammonium salts) [(per)fluoropolyether carboxylate derivative].

The (per)fluoropolyether carboxylate derivative according to this first embodiment preferably complies with formula:

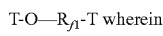

T-O—R$_{f1}$-T wherein each of T, equal or different at each occurrence is —CF$_2$—COOXa or —CF$_2$CF$_2$—COOXa;

R$_{f1}$ is a (per)fluoropolyoxyalkylene chain comprising recurring units (R°), said recurring units (R°) statistically distributed along the chain being chosen among one or more of (CFXO), (CF$_2$CF$_2$O), (CF$_2$CF$_2$CF$_2$O), (CF$_2$CF$_2$CF$_2$CF$_2$O), (CR$_4$R$_5$CF$_2$CF$_2$O), (CF(CF$_3$)CF$_2$O), (CF$_2$CF(CF$_3$)O), wherein X=F, CF$_3$; R$_4$ and R$_5$, equal to or different from each other, are selected among H, Cl, or perfluoroalkyl from 1 to 4 carbon atoms; Xa is H, a metal (preferably an alkaline or alkaline-earth metal) or an ammonium group of formula N(R$_p$)$_4$, wherein each of R$_p$, equal or different at each occurrence, is H, an alkyl group or hydroxyalkyl group.

The (per)fluoropolyoxyalkylene R$_{f1}$ has preferably a number average molecular weight in the range 500-10.000.

The (per)fluoropolyoxyalkylene R$_{f1}$ is preferably selected among following structures:
(A) —(CF$_2$CF(CF$_3$)O)$_a$(CFYO)$_b$)— wherein Y is F or CF$_3$; a and b are integers such that the molecular weight is within the above range; a/b is between 10 and 100;
(B) (CF$_2$CF(CF$_3$)O)$_a$(CFYO)$_b$—CF$_2$(R'$_F$)CF$_2$—O—(CF$_2$CF(CF$_3$)O)$_a$(CFYO)$_b$— wherein R'$_F$ is a C$_{1-4}$ (per)fluoroalkylene group;
(C) —(CF$_2$CF$_2$O)$_c$(CF$_2$O)$_d$(CF$_2$(CF$_2$)$_z$O)$_h$— wherein c, d and h are integers such that the molecular weight is within the above range; c/d is between 0.1 and 10; h/(c+d) is between 0 and 0.05; z is 2 or 3;
(D) —(CF$_2$CF(CF$_3$)O)$_e$(CF$_2$CF$_2$O)$_f$(CFYO)$_g$— wherein Y is F or CF$_3$; e, f, g are integers ≥0 such that the molecular weight is within the above range; e/(f+g) is between 0.1 and 10, f/g is between 2 and 10;
(E) —(CF$_2$(CF$_2$)$_z$O)$_s$— wherein s is an integer such to give the above molecular weight, z has the above defined meaning;
(F) —(CR$_4$R$_5$CF$_2$CF$_2$O)$_{j'}$— wherein R$_4$ and R$_5$ are equal to or different from each other and selected from H, Cl or perfluoroalkyl, j' being an integer ≥0 such that the molecular weight be that above indicated;
(G) —(CR$_4$R$_5$CF$_2$CF$_2$O)$_{p'}$—R'$_F$—O—(CR$_4$R$_5$CF$_2$CF$_2$O)$_{q'}$— wherein R'$_F$ is a C$_{1-4}$ (per)fluoroalkylene group; p' and q' are integers ≥0 such that the molecular weight be that above mentioned;
(H) —(CF(CF$_3$)CF$_2$O)$_{j''}$—(R'$_F$)—O—(CF(CF$_3$)CF$_2$O)$_{j'''}$, j'' and j''' being integers ≥0 such to give the above molecular weight, R'$_F$ is a C$_{1-4}$ (per)fluoroalkylene group.

The (per)fluoropolyether carboxylic derivative according to this first embodiment most preferably complies with formula:

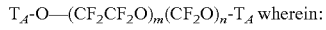

T$_4$-O—(CF$_2$CF$_2$O)$_m$(CF$_2$O)$_n$-T$_4$ wherein:

$T_A$=—$CF_2$—$COOX_a$ or —$CF_2CF_2$—$COOX_a$; m and n being integers such that the number averaged molecular weight is in the range 500 to 10 000, m/n is 0.1 to 10 and $X_a$ has the meaning as above defined.

These (per)fluoropolyether carboxylic derivatives are preferably used in the process of the invention under the form of salts obtained by neutralization of corresponding acids with inorganic or organic bases, preferably NaOH, KOH, $NH_4OH$, $R_1R_2R_3N$ type, wherein $R_1$, $R_2$, $R_3$, equal or different from each other are H, alkyl or hydroxyalkyl (e.g. methyl amine, diethyl amine, triethyl amine, ethanolamine, diethanolamine, triethanolamine, morpholine).

According to a second embodiment of the invention, the (per)fluoropolyether derivative comprises at least one functional group selected from phosphate groups and derivatives thereof (acids, esters, and the like) [(per)fluoropolyether phosphate derivative].

The (per)fluoropolyether phosphate derivative according to this second embodiment preferably complies with formula (P-1) or (P-2):

  (P-1)

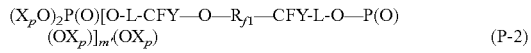  (P-2)

wherein $R_{f1'}$ is equal to —$R_{f1}$-$T_{f}$, with $T_{f}$ being a (per)fluoroalkyl $C_{1-3}$ group, optionally comprising H or Cl; $R_{f1}$ has the same meaning as above detailed; m is an integer from 1 to 3 (preferably 1 or 2); m' is an integer from 0 to 20 (preferably from 0 to 4), Y is F or $CF_3$; L is a bond or a divalent organic group; $X_p$ is H, a metal (preferably an alkaline or alkaline-earth metal) or an ammonium group of formula $N(R_p)_4$, wherein each of $R_p$, equal or different at each occurrence, is H, an alkyl group or hydroxyalkyl group.

Divalent group L is preferably selected among —$CH_2$ ($OCH_2CH_2)_n$— and —$CONR'$—$(CH_2)_q$—, with n and q being integers from 0 to 8, preferably 0 to 3.

The (per)fluoropolyether phosphate derivative according to this second embodiment more preferably complies with formula (P-3) or (P-4):

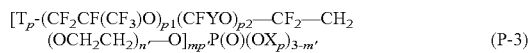  (P-3)

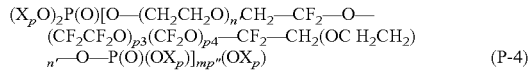  (P-4)

wherein $T_p$ is a $C_{1-3}$ (per)fluoroalkyl group, optionally comprising one or more Cl atoms, p1>0, p2≥0, p1+p2 being such that the molecular weight is within 500 to 10 000; p1/p2 being preferably between 10 and 100; n' is 0 to 3; mp is 1 or 2; p3>0, p4≥0, p3+p4 being such that the molecular weight is within 500 to 10 000; p3/p4 being preferably between 0.1 and 10, mp" is from 1 to 10.

According to a third embodiment of the invention, the (per)fluoropolyether derivative comprises at least one functional group selected from urethane moieties of formula (U-1):

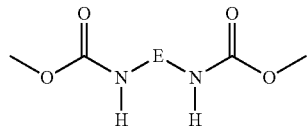

formula (U-1)

wherein E is a divalent hydrocarbon carbon group, linear or branched, optionally comprising one or more aromatic rings [(per)fluoropolyether urethane derivative].

The ((per)fluoropolyether urethane derivative advantageously comprises at least a further functional group, in addition to the urethane moiety of formula (U-1), which can be notably, a ionisable group (e.g. anionic or cationic), an unsaturated groups (e.g. a crosslinkable double bond).

The (per)fluoropolyether urethane derivative of this third embodiment is preferably a (per)fluoropolyether ionisable polyurethane polymer [polymer (PUR)] comprising at least one fluorinated block comprising a fluoropolyoxyalkene chain as above described, and at least one functional block comprising a hydrocarbon chain [chain ($R_{HC}$)] having from 2 to 14 carbon atoms, optionally comprising one or more aromatic or cycloaliphatic group, said chain ($R_{HC}$) comprising at least one ionisable group, said blocks being linked by urethane moieties of formula (U-1), as above detailed.

The expression "at least one fluorinated block comprising a fluoropolyoxyalkene chain" and "at least one functional block comprising a hydrocarbon chain [chain ($R_{HC}$)]" are understood to mean that the polymer (PUR) may comprise one or more than one fluorinated block and one or more than one functional block. Generally polymer (PUR) comprises several fluorinated blocks and several functional blocks. Optionally, in addition, polymer (PUR) might comprise additional recurring units derived from well-known polyurethane modifiers, e.g. from chain extenders, and the like.

Chain ($R_{HC}$) of the polymer (PUR) comprises at least one ionisable group, i.e. a group yielding a cationic or an anionic group in appropriate pH conditions. Among suitable ionisable groups mention can be notably made of sulphonic acid groups of formula —$SO_3H$, carboxylic acid groups of formula —COOH, and of amine groups, either comprised in chain ($R_{HC}$) backbone of formula —$N(R_N)$—, wherein $R_N$ is selected among H and hydrocarbon groups having 1 to 6 carbon atoms, or comprised in side groups as —$N(R_{N1})(R_{N2})$, wherein $R_{N1}$ and $R_{N2}$, equal or different from each other, are independently selected from H and hydrocarbon groups having 1 to 6 carbon atoms.

Preferred chain ($R'_{HC}$) is chosen among:
(j) carboxylic-containing chain ($R_{HC}$) of formula:

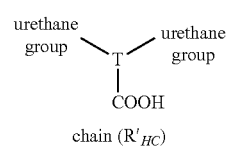

chain ($R'_{HC}$)

wherein T is an hydrocarbon trivalent group, linear or branched, cyclic or not, aliphatic or aromatic, comprising from 2 to 12 carbon atoms; chain ($R'_{HC}$) of formula -T(COOH)— is preferably selected among the followings:

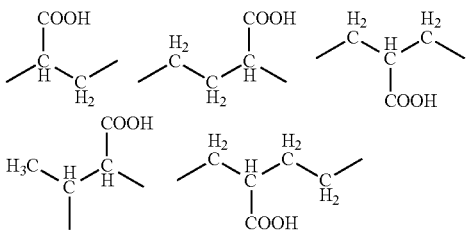

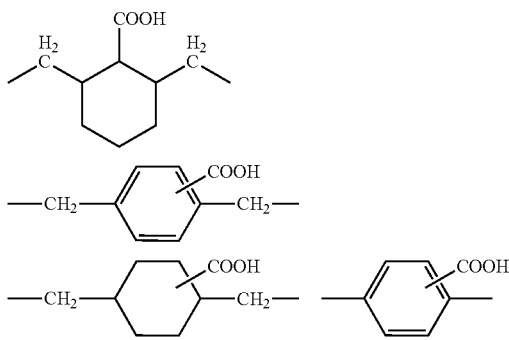

(jj) amine-containing chain (R″$_{HC}$) of formula:

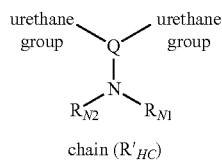

wherein $R_{N1}$ and $R_{N2}$ have the meanings as above defined, Q is an hydrocarbon trivalent group, linear or branched, cyclic or not, aliphatic or aromatic, comprising from 2 to 12 carbon atoms; chain (R″$_{HC}$) of formula -Q[N($R_{N1}$)($R_{N2}$)]— preferably complies with formula here below:

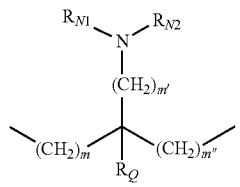

wherein $R_{N1}$ and $R_{N2}$ have the meanings as above defined, preferably $R_{N1}$ and $R_{N2}$ being independently selected among $C_1$-$C_4$ alkyl groups, linear or branched; m, m', m″ are integers from 0 to 4, with the provision that at least one of m and m″ is greater than zero; $R_Q$ being H or a $C_1$-$C_4$ alkyl group, linear or branched. Preferred amine-containing chain (R″$_{HC}$) are those of formulae —CH(CH$_2$—N(C$_2$H$_5$)$_2$)—CH$_2$— and/or —CH(CH$_2$—N(CH$_3$)$_2$)—CH$_2$—;

(jjj) amine-containing chain (R‴$_{HC}$) of formula:

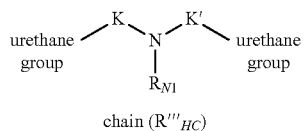

wherein $R_{N1}$ has the meaning as above defined, preferably $R_{N1}$ being selected among $C_1$-$C_4$ alkyl groups; K and K′ being divalent hydrocarbon groups having 1 to 6 carbon atoms.

Divalent hydrocarbon group E of urethane moieties is notably chosen among:

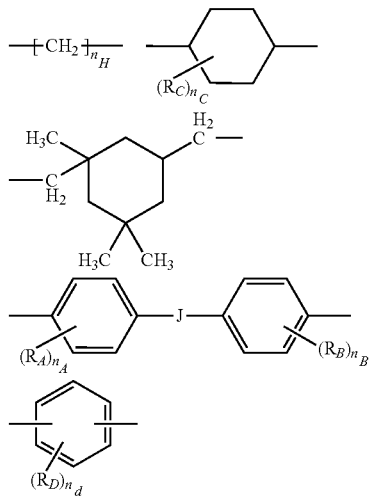

and mixtures thereof;

wherein:
$n_H$ is an integer from 1 to 12, preferably equal to 6;
J is a divalent bridging group chosen among: a single bond; a methylene group (—CH$_2$—); an oxygen atom (—O—); a —C(CH$_3$)$_2$— group; a —C(CF$_3$)$_2$— group; a —SO$_2$— group; a —C(O)— group; preferably J is a methylene group
each of $R_A$, $R_B$, $R_C$, $R_D$, equal or different at each occurrence, is independently a halogen atom (e.g. Cl, Br, F), a $C_1$-$C_6$ hydrocarbon group (e.g. methyl, ethyl), a substituent group like notably —OR$_H$, —NR$_H$R$_{H″}$, —C(O)—R$_{H‴}$, wherein R$_H$, R$_{H′}$, R$_{H″}$, R$_{H‴}$, equal or different each other, are independently at each occurrence a hydrogen atom or a $C_1$-$C_6$ hydrocarbon group;
$n_A$, $n_B$, $n_d$, are independently an integer chosen between 0 and 4;
$n_c$ is an integer from 0 to 10.

The polymer (PUR) of the composition of the invention can be notably produced by reacting
at least one hydroxyl-terminated perfluoropolyoxyalkylene complying with formula (U-2) here below:

$$Z—O—R_{f1}—Y \qquad \text{formula (U-2)}$$

wherein:
$R_{f1}$ has the same meaning as above defined;
Z and Y, equal or different each other are, at each occurrence, independently functional hydroxyl groups complying with formula —CF$_2$CH$_2$O(CH$_2$CH$_2$O)$_{s'}$H, wherein s', equal or different at each occurrence, is chosen among integers from 0 to 5; and
at least one functionalized diol of formula HO—R$_{HC}$—OH comprising at least one ionisable group, wherein R$_{HC}$ has the same meaning as above defined;
with at least one diisocyanate of formula OCN-E-NCO, wherein E has the meaning as above defined, and, optionally,
one or more chain extender with a molecular weight of 60 to 450 g/mol chosen among diols of formula HO—R$_{diol}$—OH and/or diamines of formula H$_2$N—R$_{diamine}$—NH$_2$, wherein R$_{diol}$ and R$_{diamine}$ are C$_2$-C$_{14}$ hydrocarbon groups, optionally containing additional functional groups.

Preferably the diisocyanates of formula OCN-E-NCO are selected from the following: hexamethylendiisocyanate (HDI), trimethylhexamethylenediisocyanate, isophoron diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylen-diisocyanate.

Preferably, the chain extended is an aliphatic diol or diamine with 2 to 14 carbon atoms, such as e.g. ethanediol, 1,4-butanediol, 1,6-hexanediol, diethylene glycol, dipropylene glycol and more preferably 1,4-butanediol; or (cyclo)aliphatic diamines such as e.g. isophoronediamine, ethylene diamine, 1,2-propylenediamine, 1,3-propylenediamine, N-methyl-propylene-1,3-diamine, N,N'-dimethylethylenediamine. Most preferred chain extender is 1,4-butanediol.

The composition used in the process of the invention typically comprises the (per)fluoropolyether derivative in a liquid carrier.

According to a first embodiment, the liquid carrier is an aqueous medium, i.e. a medium comprising water as major component (>50% wt). Compositions of the invention comprising an aqueous medium are generally preferred when environmental impact is considered.

The (per)fluoropolyether derivative may be solubilized or emulsified in the aqueous medium of this embodiment. The aqueous medium may optionally comprise a polar organic solvent, e.g. at least one of alcohols, glycols, ethers. As alcohols, isopropanol, ethanol, methanol, t-butanol can be used; as ethers, mention can be made of dipropylenglycol monomethylether; as glycols, ethylene or propylene glycols can be mentioned.

According to a second embodiment, the liquid carrier is a solvent medium, i.e. a medium comprising an organic solvent as major component (>50% wt). Solvent media of this embodiment are preferred when the process is applied to the treatment with PFPE derivatives which have poor solubility/dispersability in water.

Said organic solvent can be fluorinated or non fluorinated. Among suitable solvents, mention can be made of polar organic solvents, which are typically selected among alcohols, glycols, ethers, esters, alkyl carbonates, ketones and (hetero)cyclic derivatives. Mention can be notably made of isopropanol, ethanol, methanol, t-butanol, dipropylenglycol monomethylether, methylethylketone, ethylacetate, dimethylcarbonate, diethylcarbonate, N-methylpyrrolidone. Isopropanol is generally the solvent of choice when food approval is required.

Optionally, the composition might comprise additional components or ingredients.

The composition may notably comprise the (per)fluoropolyether derivative in combination with at least one water-dispersible or water-soluble cationic polymer. This combination is particularly advantageous when the (per)fluoropolyether derivative is a (per)fluoropolyether carboxylate derivative as above described.

Said cationic polymers have typically a charge density of at least 1 meq/g of dry polymer; they are generally selected among polyamines and/or polyamido-amines. Cationic polymers suitable to the purposes of the invention are notably those disclosed in EP 1690882 A (SOLVAY SOLEXIS S.P.A.) Aug. 16, 2006.

Also, the composition may contain any suitable latex known to the art. By way of example, suitable latexes include styrene-acrylic copolymer, acrylonitrile styrene-acrylic copolymer, polyvinyl alcohol polymer, acrylic acid polymer, ethylene vinyl alcohol copolymer, ethylene-vinyl chloride copolymer, ethylene vinyl acetate copolymer, vinyl acetate-acrylic copolymer, styrene-butadiene copolymer and acetate-ethylene copolymer; styrene-acrylic copolymer, styrene-butadiene copolymer, or vinyl acetate-acrylic copolymer are preferred.

Also, the composition may optionally comprise one of more of hydrosol, starch, sodium alginate, carboxy methyl cellulose, proteins and the like.

The composition may optionally comprise a pigment or a dye. Suitable pigments include kaolin clay, delaminated clays, structured clays, calcined clays, alumina, silica, aluminosilicates, talc, calcium sulfate, ground calcium carbonates, and precipitated calcium carbonates. Suitable dyes are typically organic dyes, comprising e.g. chormophores, like, for instance, derivates of acridine, anthraquinone, diphenyl or triphenylmethane, azo-compounds, nitro- or nitroso-substituted compounds, quinone, phthalocyanines, thiazin, thiazole, oxazin, oxazone, xanthene, fluorine.

Also, the composition may comprise other additives including clays, dispersants, lubricants, defoamers, film-formers, antifoamers and crosslinkers.

In the process of the invention, the composition comprising at least one (per)fluoropolyether additive is applied by means of a printing process on at least a portion of the surface of said cellulose substrate.

The term 'printing process' is hereby intended to denote any kind of process which enables selectively applying a chemical on a pre-formed cellulose substrate surface according to a pre-determined pattern.

The printing process also advantageously comprises a drying step; in this step the composition applied onto the substrate is dried, that is to say all volatile components (e.g. the liquid carrier, . . . ) are eliminated.

Said drying step might be performed by different means; among others, mention can be made of heated rolls, hot air ovens, IR driers of UV driers.

In the case of UV driers, simultaneously to drying, UV-catalyzed crosslinking may be obtained, in case the composition comprises PFPE derivatives comprising UV-crosslinkable moieties.

Among printing techniques, those based on transfer of the composition to the cellulose substrate from engraved or depressed surfaces (intaglio techniques) are preferred. Among them mention can be made of gravure and flexographic methods.

It should be outlined that these intaglio printing processes are preferred as they are particularly suitable for transferring into cellulose substrates compositions having low viscosity, such as those used in the invention, and are compatible with aqueous media.

Gravure printing typically uses a depressed or sunken surface for the pattern to be reproduced on the cellulose substrate. The pattern areas consist generally of honey comb shaped cells or wells that are etched or engraved into a cylinder, typically a metal cylinder (copper being preferred). The unetched areas of the cylinder represent the non-image or unprinted areas. The cylinder usually rotates in a bath of liquid composition, typically called the 'ink pan'.

As the engraved cylinder turns, the excess composition is generally wiped off the cylinder by a flexible doctor blade. The composition remaining in the recessed cells advantageously forms the pattern by direct transfer to the substrate (paper or other material) as it passes between the engraved cylinder and an impression cylinder, typically rubber coated.

Flexography, which is the major process used to print packaging materials, e.g. corrugated containers, folding cartons, multiwall sacks, paper sacks, plastic bags, milk and beverage cartons, disposable cups and containers, labels, adhesive tapes, envelopes, newspapers, and wrappers (candy and food), is another example of intaglio printing process.

In the typical flexographic printing process, a positive mirrored master of the required pattern is generally reproduced as a 3D relief on a rubber or polymer material roll or plate (printing cylinder).

The target amount of composition is deposited upon the surface of the printing plate (or printing cylinder) generally using an engraved anilox roll, typically coated by an industrial ceramic whose surface contains millions of very fine dimples or cells, whose texture holds a specific amount of composition by dipping in a suitable bath of the same, excess being scraped by means of a doctor blade. The so-loaded printing cylinder finally transfers the composition onto the substrate.

Raw Materials

NALKAT® 2020 cationic fixative available from Nalco Company is a polydiallyldimethylammonium chloride (Poly-DADMAC) of formula:

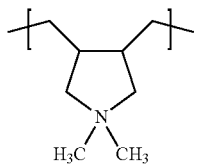

AIRVOL® 125 additive commercially available from Airproducts is a polyvinyl alcohol water dispersion having a dry content of 25% w/w.

Test Methods

Determination of Oil Repellence of Cellulose Substrates

Cellulose substrates were submitted to the so-called 'kit-test' or 'Grease Resistance Test for Paper and Paperboard' according to TAPPI Test Method T 559 cm-02 standard, the higher the rating, and the better being the oil repellence of the substrate.

Fatty Acid Test—NFA Test

Resistance of cellulose substrates against fatty acids was determined as follows. Fatty Acid solutions numbered from 1 to 11 (from less to most aggressive) were prepared blending different amounts of Castor oil, Oleic acid (C18:1) and Octanoic acid (C8:0) and conditioned at 60° C. Specimens of substrates were introduced in an oven maintained at 60° C. and 5 drops of each test solution were dipped onto each sample. After 5 minutes at 60° C., oil drops were removed with absorbent tissue and substrates were inspected for darkening of surface.

Rating of a substrate corresponded to the highest number of the fatty acid solution that causes no alteration to the surface.

Synthesis of (Per)Fluoropolyether Additives

Preparative Example 1

An anionic (per)fluoropolyether polyurethane additive was manufactured according to the teachings of EP 1273704 A (AUSIMONT SPA (IT)) Jan. 8, 2003 by reacting:
  507 g of (per)fluoropolyether (PFPE) diol (FLUO-ROLINK® D10H), having hydroxyl equivalent weight 761 (666 meq.);
  148 g of isophorone diisocyanate (1333 meq); and
  46 g of dimethylpropionic acid (DMPA) (671 meq) salified with 27 g of triethyl amine (267 meq).

An aqueous dispersion with a solid content, determined as dry residue, of 25% by weight of polymer having anionic group was obtained.

Preparative Example 2

A (per)fluoropolyether phosphate derivative was manufactured following teachings of EP 1225178 A (AUSIMONT SPA (IT)) Jul. 24, 2002 by reacting:
  100 g of (per)fluoropolyether (PFPE) diol (FLUO-ROLINK® E10H), having hydroxyl equivalent weight 724 (0.138 eq.);
  0.025 g of water (0.025 mol); and
  9.9 g of $P_2O_5$ (0.069 mol).

An aqueous dispersion with a solid content, determined as dry residue, of 20% by weight of polymer having ammonium phosphate anionic group was obtained.

Preparative Example 3

A (per)fluoropolyether carboxylic derivative was manufactured following teachings of EP 1484445 A (SOLVAY SOLEXIS SPA (IT)) Dec. 8, 2004 by reacting:
  500 g of (per)fluoropolyether (PFPE) diacid of formula:

$$HOOC-CF_2-O-(CF_2O)_a(CF_2CF_2O)_b-CF_2COOH$$

a and b being integers such that the number averaged Mw is 1500;
  9 g of a 30% wt ammonia solution.

An aqueous dispersion with a solid content, determined as dry residue, of 20% by weight of (per)fluoropolyether diacid ammonium salt was obtained.

Gravure Method and Machine

A 4-color Cerutti webfed gravure press was used, wherein the coarse cylinder was a 150 lpi continuous cylinder. The treating solution was applied by the applicator roll to the substrate and the excess was removed by a doctor blade. The sheet speed was 400 ft/min. The paper substrate was treated on only one side. The treated paper was dried using IR driers operated at 220° F.

Bleached paper boards, also known as solid bleached sulfite (SBS) boards, which are premium paperboard grade produced from a furnish containing at least 80% virgin bleached wood pulp, having weight of 527 lb/100 sq feet (25.7 kg/m$^2$), were used in this test.

Results of repellence properties of the treated paper are summarized in the following table:

TABLE 1

| Composition | PFPE on dry (%)[2] | Wet pick up (%)[3] | Kit Test | Fatty Acid |
|---|---|---|---|---|
| 30% material of Ex. 1 (7.5% PFPE); 7.7% IPA[1]; 62.3% Water | 0.15 | 2 | 9 | 4 |
| 25% material of Ex. 1 (6.25% PFPE); 10% IPA[1]; 75% Water | 0.13 | 2 | 8 | 3 |
| 15% material of Ex. 1 (3.75% PFPE); 10% IPA[1]; 75% Water | 0.06 | 1.6 | 8 | 3 |
| 5% material from Ex. 2 (1% PFPE); 10% IPA[1]; 85% Water | 0.016 | 1.6 | 8 | 2 |
| 4% material from Ex. 2 (0.8% PFPE); 10% IPA[1]; 85% Water | 0.018 | 2.2 | 9 | 4 |
| 3% material from Ex. 2 (0.6% PFPE); 10% IPA[1]; 87% | 0.013 | 2.2 | 8 | 5 |

TABLE 1-continued

| Composition | PFPE on dry (%)[2] | Wet pick up (%)[3] | Kit Test | Fatty Acid |
|---|---|---|---|---|
| Water | | | | |
| 5% material from Ex. 3 (1% PFPE); 1.3% NALKAT ® 2020; 93.7% Water | 0.022 | 2.2 | 9 | 3 |
| 7.5% material from Ex. 3 (1.5% PFPE); 1.9% NALKAT ® 2020; 90.5% Water | 0.019 | 1.5 | 9 | 2 |
| 10% material from Ex. 3 (2% PFPE); 1.3% NALKAT ® 2020; 88.7% Water | 0.027 | 1.4 | 8 | 3 |

[1]IPA = isopropyl alcohol;
[2]% wt (per)fluoropolyether derivative onto dried substrate;
[3]% wt composition transferred onto substrate (before drying)

Data summarized herein above demonstrate that (per)fluoropolyether derivatives can be successfully applied by means of this intaglio printing method, providing acceptable oil repellence. As shown in the table, these properties (e.g. a kit test ranking of at least 8) can be achieved with concentrations of (per)fluoropolyether derivatives as low as 0.1% wt or less. As a comparison, when (per)fluoropolyether additives have been applied by size-press or wet-end treatment in the manufacture of SBS paper of similar weight, amounts of (per)fluoropolyether derivatives required for achieving similar performances were found to be as high as 0.2 to 0.6% wt (see EP 1690882 A, EP 1489124 A, EP 1484445 A).

Flexo Method and Machine

In the Flexo machine used for these embodiments, a (per)fluoropolyether containing composition was applied on a cellulose substrate via an anilox roll with 165 cells per square inch, with each cell volume of 13 billion cubic microns (165/13 BCM), equipped with a doctor blade for removal of excess composition. The cellulose substrate was treated on only one side. Sheet speed was 300 ft/min (91.4 m/min). Treated substrate was dried using IR driers.

Cellulose substrate used was bleached kraft paper having weight 30 lb/3000 sq ft (48.8 g/m$^2$).

As a comparison, similar runs were carried out using instead of the (per)fluoropolyether derivative, a fluoro-containing material commercially available as ZONYL® 9464 additive, having a fluoroacrylate structure and a fluoro-containing material commercially available as LODYNE® 2010 from CIBA, which is a perfluoroalkyl-substituted carboxylic acid.

Results of repellence properties of the treated paper are summarized in the following table:

TABLE 2

| Composition | PFPE on dry (%)[2] | Wet pick up (%)[3] | Kit Test | Fatty Acid |
|---|---|---|---|---|
| 50% material Ex. 1 (12.5% PFPE); 20% PVOH[1]; 30% Water | 1.5 | 11.5 | 9 | 3 |
| 100% material Ex. 1 (25% PFPE) | 1.6 | 6.47 | 8 | 2 |
| 85% material of Ex. 2 (17% PFPE); 5% PVOH[1]; 10% Water | 1.91 | 11.07 | 7 | 4 |
| 20% ZONYL ® (Comparative example) | 1.44 | 7.18 | <3 | 0 |
| 20% ZONYL ®; 15% PVOH[1] (Comparative example) | 2.17 | 22 | <3 | 0 |
| 52% LODYNE ® 2010; 48% Water | 2.27 | 11.35 | <3 | 0 |

[1]PVOH = AIRVOL ® 125 additive, as above detailed;
[2]% wt (per)fluoropolyether derivative onto dried substrate;
[3]% wt composition transferred onto substrate (before drying)

As shown in the table herein above, only using the (per)fluoropolyether additives of the process of the present invention, it is possible to obtain kraft paper having acceptable oil and water repellence at limited fluorochemical loads. Examples of comparison well demonstrate that ZONYL® or LODYNE® fluoro-containing materials, otherwise actively advertised for being used in printing/coating processes, fail to deliver by flexographic methods kraft paper possessing acceptable grease resistance, even at increased fluorochemical loads.

Results hereby provided thus well demonstrate that only PFPE derivatives as those of the process of the invention advantageously deliver grease, oil and water repellence when applied by means of printing processes.

The invention claimed is:

1. A process for imparting grease, oil and water repellence to a cellulosic substrate, said process comprising:
    applying by means of a gravure method printing process on at least a portion of the surface of said cellulosic substrate a composition comprising from about 1 to 2 percent by weight of at least one (per)fluoropolyether derivative; and
    subjecting at least one surface of the substrate that did not have (per)fluoropolyether derivative applied by means of the gravure printing method to at least one further processing condition;
    wherein the (per)fluoropolyether derivative complies with formula: T-O—$R_{fl}$-T, wherein each of T, equal or different at each occurrence is —$CF_2$—COOXa or —$CF_2CF_2$—COOXa; $R_{fl}$ is a (per)fluoropolyoxyalkylene chain comprising recurring units (R°), said recurring units (R°) statistically distributed along the chain being one or more units selected from the group consisting of (CFXO), ($CF_2CF_2O$), wherein X=F, $CF_3$; Xa is H, a metal, or an ammonium group of formula $N(R_p)_4$, wherein each of $R_p$ is H.

2. The process of claim 1, wherein the dry amount of the at least one (per)fluoropolyether derivative applied onto the cellulosic substrate is about 0.019 to 0.027 percent by weight of the cellulosic substrate.

3. The process of claim 1, wherein the at least one further processing condition comprises gluing or printing at least one surface of the cellulosic substrate not possessing (per)fluoropolyether derivative.

* * * * *